(12) United States Patent
Gröning

(10) Patent No.: US 10,714,999 B2
(45) Date of Patent: Jul. 14, 2020

(54) ROTOR WITH LATTICE STRUCTURE

(71) Applicant: WITTENSTEIN SE, Igersheim (DE)

(72) Inventor: Ingolf Gröning, Bad Mergentheim (DE)

(73) Assignee: WITTENSTEIN SE, Igersheim (DE)

( * ) Notice: Subject to any disclaimer, the term of this patent is extended or adjusted under 35 U.S.C. 154(b) by 349 days.

(21) Appl. No.: 15/480,925

(22) Filed: Apr. 6, 2017

(65) Prior Publication Data

US 2017/0317545 A1 Nov. 2, 2017

(30) Foreign Application Priority Data

Apr. 27, 2016 (DE) .................. 10 2016 107 824

(51) Int. Cl.
| | | |
|---|---|---|
| *H02K 1/30* | (2006.01) | |
| *H02K 15/02* | (2006.01) | |
| *H02K 1/02* | (2006.01) | |
| *H02K 1/27* | (2006.01) | |
| *H02K 15/03* | (2006.01) | |

(52) U.S. Cl.
CPC .................. *H02K 1/30* (2013.01); *H02K 1/02* (2013.01); *H02K 1/278* (2013.01); *H02K 15/02* (2013.01); *H02K 15/03* (2013.01)

(58) Field of Classification Search
CPC ..................................................... H02K 1/27; H02K 15/03; H02K 1/02; H02K 1/278; H02K 15/02; H02K 1/30
See application file for complete search history.

(56) References Cited

U.S. PATENT DOCUMENTS

| | | | | |
|---|---|---|---|---|
| 5,710,471 A | * | 1/1998 | Syverson | ............... H02J 7/1423 310/114 |
| 2002/0180304 A1 | * | 12/2002 | Knauff | ..................... H02K 1/30 310/261.1 |
| 2012/0205996 A1 | * | 8/2012 | Buttner | .................. H02K 15/00 310/54 |
| 2015/0229184 A1 | * | 8/2015 | Lange | .................... H02K 1/276 310/51 |

FOREIGN PATENT DOCUMENTS

| | | | |
|---|---|---|---|
| DE | 10126340 B3 | 12/2002 | |
| GB | 372899 A | * 5/1932 | ............... H02K 9/06 |

OTHER PUBLICATIONS

German Search Report for Appl. No. 102016107824.7, dated Dec. 26, 2016 (7 pages).

* cited by examiner

*Primary Examiner* — Naishadh N Desai
(74) *Attorney, Agent, or Firm* — Meunier Carlin & Curfman LLC

(57) ABSTRACT

A rotor for an electric machine, comprising an outer shell for receiving magnets, and a three-dimensional lattice structure arranged within the outer shell where the three-dimensional lattice structure has a unit cell comprising at least a strut and varies in all directions in space including in an axial direction of the rotor.

20 Claims, 3 Drawing Sheets

ROTOR WITH LATTICE STRUCTURE

This application claims priority to, and the benefit of, German Appl. no. 102016107824.7, filed Apr. 27, 2016, which is incorporated by reference herein in its entirety.

TECHNICAL FIELD

The invention relates to a rotor for an electric machine and also to a method for producing a rotor.

BACKGROUND

The prior art discloses rotors for electric motors which serve to transmit a torque generated by electromagnetic forces. These rotors are usually mounted in a housing and comprise receptacles or fastening options for windings of electromagnets or for permanent magnets.

High dynamics are required of electric motors in many applications. Furthermore, the rotors should be stable and easy to manufacture.

DE 101 263 40 A discloses a rotor comprising webs which are arranged like secants and which connect an outer shell of the rotor to an inner part of the rotor. However, the weight saving is limited and the assembly is complicated under certain circumstances.

SUMMARY

It is an object of the invention to improve rotors known from the prior art or to specify a method for producing an improved rotor. In particular, it is also an object of the invention to provide a rotor for an electric motor with high dynamics.

The object is achieved by a rotor as claimed in claim 1 and by a method for producing a rotor as claimed in the additional independent claim.

A first aspect of the invention relates to a rotor for an electric machine, comprising an outer shell for receiving magnets, and a three-dimensional lattice structure arranged within the outer shell.

A further aspect of the invention relates to a method for producing a rotor in one of the typical embodiments described herein, comprising providing a carrier; applying a layer of a metal powder to the carrier; sintering predetermined regions of the layer of the metal powder; repeating the two previous steps several times, wherein the regions are selected in order to create a structure corresponding to the rotor; and removing the structure from the carrier.

Typical rotors of embodiments comprise an outer shell for receiving magnets. Typical rotors comprise magnets arranged on the outer shell, for example magnets held by means of undercuts. The undercuts can also be referred to as dovetails for receiving the magnets. In further embodiments, magnets are molded into a plastic injection-molded encapsulation. A further possibility is for magnets to be adhesively bonded on. Typical magnets may be permanent magnets or electromagnets, formed for example by coils.

Typical embodiments comprise a three-dimensional lattice structure arranged within the outer shell. Here, three-dimensional typically means that the lattice structure is defined three-dimensionally, in contrast for example to two-dimensionally defined structures, which merely extend in the third dimension, for example in an axial direction. One example of such a two-dimensional shape, which does not correspond to a three-dimensional lattice structure, is a honeycomb structure having axially extending honeycombs, for example. A three-dimensional coordinate system is typically required for describing the three-dimensional lattice structure. Typical three-dimensional lattice structures have a structure which varies in all directions in space in a three-dimensional coordinate system.

Typical lattice structures of embodiments comprise at least one or a combination of the following structures: face-centered cubic, body-centered cubic, face-centered orthorhombic, body-centered orthorhombic, triclinic, optionally likewise body-centered or face-centered, and also body-centered tetragonal, tetrahedral lattice, hexagonal or further lattice structures which form a three-dimensional framework. Preference is given to lattice structures of embodiments which comprise at least one or a combination of the following structures: face-centered cubic, body-centered cubic, face-centered orthorhombic, body-centered orthorhombic.

Typical embodiments comprise a lattice structure having a combination of a face-centered lattice and a body-centered lattice, wherein both a face-centered system and a body-centered system are present in a unit cell of such a lattice. This affords a particular degree of rigidity. Typical embodiments comprise a combination of a face-centered orthorhombic lattice with a body-centered orthorhombic lattice; further typical embodiments comprise a combination with a face-centered cubic lattice and a body-centered cubic lattice. In testing, the latter combination displays a particularly high rigidity combined with a low weight for connecting an outer shell to an inner part of a rotor of an electric machine. In principle, individual struts of the lattice structure can also be arranged in an inclined manner, for example inclined by up to 10° or up to 5° in a cubic lattice or an orthorhombic lattice.

The lattice structure typically has a radial extent of at least two, typically at least four, unit cells. Typical lattice structures have a maximum radial extent of at most 15 or at most 20 or at most 50 unit cells. Typical embodiments comprise lattice structures which have an axial extent of at least two or at least four, preferably at least 10, particularly preferably at least 15, unit cells, very particularly preferably at least 20 unit cells. Typical lattice structures have a maximum axial extent of at most 150 unit cells or at most 100 or at most 50 unit cells.

The radial extent of the lattice structure typically corresponds at least to the thickness of the outer shell or at least to one and a half times the thickness of the outer shell or at least to twice the thickness of the outer shell. This achieves a particularly high reduction in weight combined with an adequate rigidity. The thickness in the radial direction of an inner part is typically less than 30% of the radial extent of the lattice structure or less than 20% of the radial extent of the lattice structure. The radial extent of the lattice structure typically refers to the thickness of the lattice structure between an inner part and the outer shell. In typical embodiments, the lattice structure directly adjoins the outer shell. In typical embodiments, the inner part directly adjoins the lattice structure. In further embodiments, further parts typically likewise manufactured in one piece are arranged between said elements.

The outer shell and the lattice structure are typically formed in one piece. In typical embodiments, the outer shell and the lattice structure form a monolithic unit. The outer shell and the lattice structure are typically produced in one procedure, for example in a laser sintering process or in a 3D printing process. In further embodiments, the inner part, the lattice structure and the outer shell are formed in one piece or in monolithic form. This is typically achieved by the inner part, the lattice structure and the outer shell being produced in one operation, for example in a laser sintering method. In this way, the production is simplified and unnecessary flaws are avoided.

Typical rotors of embodiments comprise an inner part, which is connected to the outer shell by the lattice structure. Typical inner parts of embodiments comprise openings for allowing residual material to be discharged during the sintering inward into a hollow space of the inner part. Typical inner parts are configured as a hollow shaft or as a hollow tube. Typical inner parts have a cylindrical lateral surface.

Typical openings of inner parts can run over the entire extent of the inner part, but they may also be limited to specific regions. A circumferential opening affords the advantage of particularly simple discharge for excess material. In typical embodiments, a circumferential opening is arranged at one end of the inner part. In this way, it suffices to keep the rotor tilted typically in various positions in order to allow material to trickle out. In further embodiments, at least two openings are provided. These allow air to be blown into one of the openings such that excess sintering material is blown out of the other opening with the assistance of the air. Typical embodiments comprise, for example, a circumferential opening at an axial end of the inner part and a further circumferential opening at an opposing axial end of the inner part.

The outer shell of embodiments is typically of closed configuration. This achieves a particularly high stability. In further embodiments, openings are provided in the outer shell, for example in order to allow material to trickle out during the sintering.

The rotor typically has an axis of rotation, about which the outer shell is arranged concentrically or cylindrically. In typical embodiments, a concentric hollow space having the lattice structure is located between the inner part and the outer shell. Axial side walls are typically arranged at the axial ends of the outer shell, of the lattice structure and if appropriate of the inner part. The axial side walls can typically be closed completely or else can be provided with openings. The thickness of the side walls typically corresponds to at least 20% or at least 40% or at most 100% of the thickness of the outer shell. In further embodiments, provision may be made of further axial walls, arranged for example in the center of the rotor, for example in order particularly to stabilize a central region.

The rotor is typically produced by an additive method, in particular using a metal powder. In this way, the rotor can be manufactured in a stable manner and with a very high level of precision.

In production methods of typical embodiments, axial planes of finite extent are sintered in succession. Here, it is typically the case that firstly a first layer is applied directly to the carrier (b) and then selectively sintered (c). Then, further layers of metal powder are applied to the already partially sintered layers of metal powder, and respectively selectively sintered. This corresponds to b) and c) being carried out once again, wherein the layers then no longer rest directly on the carrier, but instead with already selectively sintered layers lying therebetween. To this end, the carrier is typically moved downward by one layer thickness before a new layer is applied. The carrier is typically delimited on all sides by a structure which prevents the non-sintered metal powder from trickling out laterally.

Embodiments afford the advantage of a low weight, a low mass moment of inertia, and a quick or flexible possibility for production. The invention makes it possible to also produce lightweight rotors in small batches.

An additive method, in particular using a metal powder, is typically used for producing the rotor. Additive methods are typically distinguished by layer-by-layer, local melting of a pulverulent starting material. Typical starting materials are metal powders or plastic granules. One example of an additive method is selective laser sintering of a metal powder.

In typical embodiments, the rotor is produced using a three-dimensional printing method (jet method), which can give rise to the advantage that the rotor can be produced directly in hollow form, but under certain circumstances not in such a filigree form as is the case in a method with laser sintering.

In typical embodiments, the rotor, for example the outer shell and the lattice structure, is manufactured in one piece. This gives rise to a monolithic, stable product, which, in spite of a low weight, can be very rigid. The inner part or if appropriate the side walls are typically also produced in one piece with the outer shell. In further embodiments, the rotor is assembled from various parts; by way of example, the inner part is inserted into the lattice structure. In this way, a variety of rotors can be produced with few starting products in production.

In typical methods of the invention, the layers are applied in an axial direction. Typically, the manufacturing direction is axial in the case of methods for producing the rotor. This gives rise to simple geometrical relationships between the structures; by way of example, manufacturing guidelines can be specified in a cylinder coordinate system. In further embodiments, the rotor is manufactured in a radial direction. In this way, it is possible for the production process to be accelerated under certain circumstances.

In typical methods, a laser is used for the sintering. In this way, sintering can be effected rapidly and precisely. Typical methods are also referred to as selective laser sintering. Typical lasers are CO2 lasers, Nd:YAG lasers or fiber lasers. In further methods of typical exemplary applications, other sintering methods are used.

In typical production methods, only hollow spaces which are connected to the environment are formed in the rotor, since the non-sintered material should also be removed. One possibility is to allow the material to fall out. In embodiments, non-sintered material is blown out.

In embodiments, material is present over the entire extent of the outer shell of the rotor in at least one axial portion of the rotor. In this portion, there are therefore no radial openings. These may be regions in which bearings are planned in order to allow for a fit or clamping. In further embodiments, the entire outer shell is configured in closed form. Material can be blown out, for example, through radial openings in the inner part or through axial openings in the side walls. Bearing portions, i.e. portions in which bearings are planned, are typically reworked, for example ground. In typical embodiments, at least one of the following elements, if present, is configured in solid form: outer shell, inner part of the rotor, side walls. In typical embodiments, at least one axial portion of the rotor can be configured in solid form. This means that solid material is provided instead of the lattice structure. This affords greater stability, for example for the assembly of a transducer.

Typical materials for the rotor depend on the operational environment, it being possible for high-grade steels to be used in the case of acids, alkaline solutions or in the food sector. Invar materials can be used given particular demands in respect of thermal expansions; Inconel materials can be used if corrosion resistance is required, in particular in combination with high thermal loading.

For embodiments of rotors, aluminum alloys are also possible; if magnetic conductivity of the rotor is required, it is possible to use carbon-containing steel that is alloyed to a small extent or unalloyed; and in the case of high-strength rotors, it is possible to use titanium alloys.

It is not absolutely necessary for the rotor to be magnetically conductive. In embodiments in which the rotor is magnetically non-conductive, laminated cores are typically applied for the flux conduction in a radial direction. These laminated cores of the rotor have only a small radial extent on account of the high magnetic conductivity, and are also suitable for high frequencies, since the resulting losses are low. If the rotor is magnetically conductive, the rotor is typically suitable for applications with low and medium harmonics acting on the rotor.

The rotor manufactured in one piece by described typical production methods does not yet represent a complete rotor for an electric machine. This typically also requires the addition of an excitation, e.g. by the application or introduction of magnets, for example permanent magnets or electric magnets, and optionally of laminated rotor cores. Laminated cores can even be applied to the rotor, where they are fixed for example by adhesive bonding or clamping. If the magnets are intended to be adhesively bonded directly to the rotor, or are inserted into recesses there, the rotor is typically to be configured in terms of shape in such a way that a sufficiently large area can be wetted with adhesive or a form-fitting or force-fitting connection is achieved, such as to form a sufficiently strong connection. Application of the laminated core to a rotor with radial openings may have particular advantages.

Advantages of embodiments comprise inter alia a low overall weight or a possibility for measuring the rotor temperature. Embodiments of the invention have the effect of reducing the thermal resistance in the case of motors which use embodiments of the invention and which operate in a medium such as, for example, oil or air, such that lower rotor temperatures and higher motor powers are possible.

In typical production methods, a layer of a metal powder is placed in each case over a carrier or subsequently over the partly manufactured object and then sintered at specific locations using a laser, such that the metal powder particles combine at these locations and also enter into a connection with sintered layers lying therebeneath. Unsintered metal powder remains in all of the non-sintered regions and can be available for further sintering processes after the complete workpiece has been separated from the structure.

Lightweight rotors can be produced very easily using the typical production methods described. Production in an axial direction is typical, since as a result the mechanical properties, such as high tensile and compressive strength, for typical later application correspond very well to the loading which arises in said application. In further embodiments, the shaft is manufactured in a radial direction, for example in order to shorten the manufacturing time.

Typical advantages of embodiments are a high flux density for reducing the rotor scattering or an improvement in the magnetic anisotropy. Typically, a low weight is achieved.

Typical embodiments have a very good mechanical strength or a very good pressure distribution. It is typically possible to transmit at least 80% or at least 90% or up to 97% or up to 99% of the force of a solid shaft.

Typical embodiments have a high rigidity, which in some cases may be better than in the case of solid material, or a low inertia, such that high dynamics can be achieved.

It is typically possible to achieve a better prediction and reproducibility of the magnetic properties, in particular compared to laminated cores.

Typical production methods have very small manufacturing tolerances. Flexible and rapid manufacturing, suitable in particular for small batches, is typically achieved.

BRIEF DESCRIPTION OF THE DRAWINGS

Further advantages and features of preferred embodiments of the invention will be explained hereinbelow with reference to the accompanying drawings, in which.

DETAILED DESCRIPTION

Figure 1:
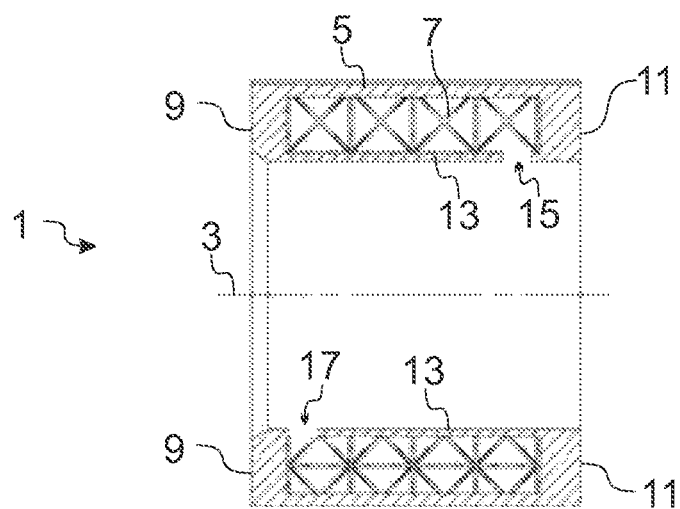
FIG. 1 shows one embodiment of the invention in a schematic longitudinal section.

FIG. 1 shows a typical embodiment of a rotor 1 in a schematic longitudinal section.

Figure 5:
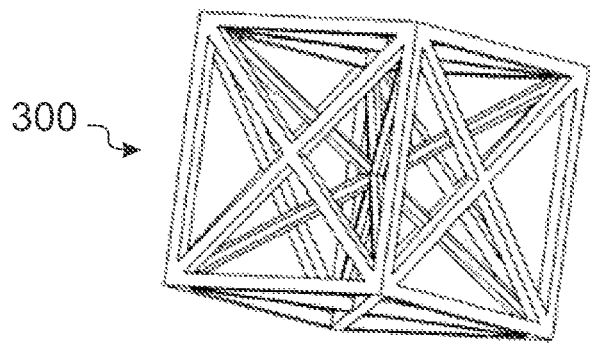
FIG. 5 schematically shows a unit cell of a typical lattice structure of exemplary embodiments.

The rotor 1 comprises an outer shell 5, which is circumferential concentrically about an axis of rotation 3. A lattice structure 7 representing a combination of a body-centered cubic lattice and a face-centered cubic lattice is shown within the outer shell 5. This means that the lattice axes both of the body-centered cubic lattice and of the face-centered cubic lattice are present within a unit cell. FIG. 5 shows a corresponding unit cell by way of example.

In the illustration of FIG. 1, the radial extent of the three-dimensional lattice structure 7 is merely one unit cell. This is chosen by way of example for better clarity. Typical exemplary embodiments comprise at least two unit cells in the direction of radial extent.

The hollow space in which the lattice structure 7 is arranged is delimited axially by axial side walls 9 and 11. An inner part 13 is arranged radially within the lattice structure 7 and is likewise arranged concentrically like a shell about the axis of rotation 3. The inner part 13 is formed in one piece with the lattice structure 7, the outer shell 5 and also the side walls 9 and 11.

The inner part 13 comprises two openings 15 and 17 lying point-symmetrically opposite one another, in each case at axial ends of the lattice structure 7.

In further embodiments, the openings are formed circumferentially in each case at the axial ends.

The rotor 1 is produced by laser sintering. After the laser sintering, it is necessary to remove excess metal powder from the hollow space of the lattice structure 7. To this end, the rotor can be tilted, such that material trickles out of the opening 17. To provide assistance, air can be blown into the opening 15.

The inner part 13 has a radial thickness which is smaller than the radial thickness of the outer shell 5; in the exemplary embodiment shown in FIG. 1, the thickness of the inner part amounts to 50% of the thickness of the outer shell 5.

Figure 2:
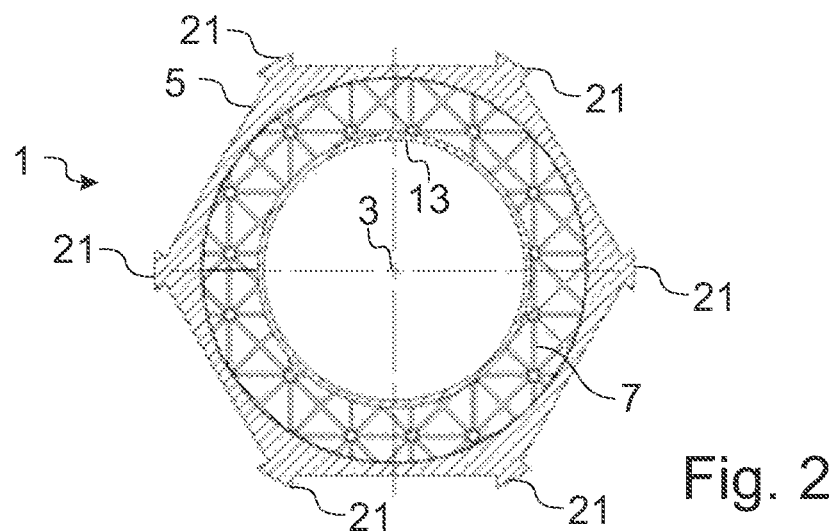
FIG. 2 shows the embodiment shown in FIG. 1 in a schematic cross section.

FIG. 2 shows a schematic cross section through the embodiment shown in FIG. 1, the cross section being depicted approximately in the center of the rotor. For the description of FIG. 2, the same reference signs are used for the same parts and not all parts are explained in detail again.

On its outer side, the outer shell 5 has dovetail-shaped or mushroom-shaped protrusions 21, these being suitable in each case to hold magnets, for example permanent magnets, which are pushed in axially.

Figure 3:
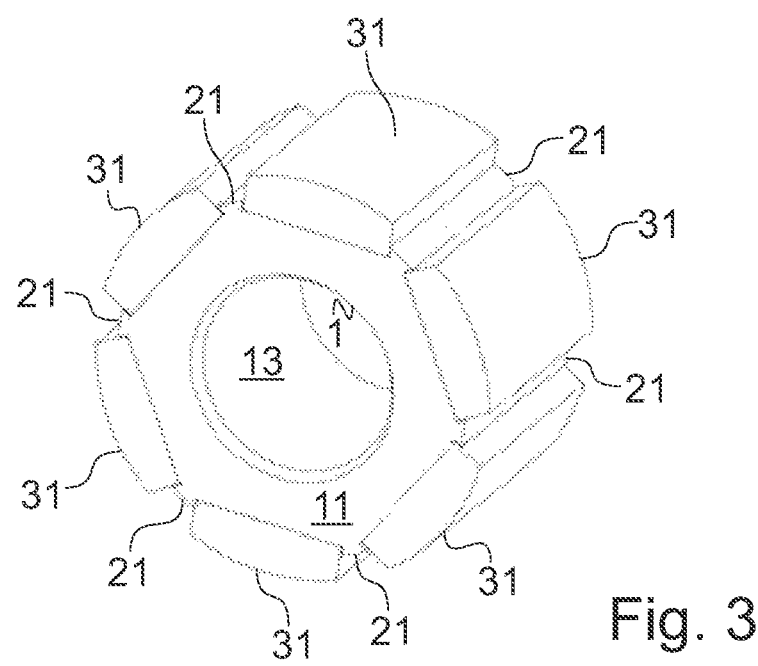
FIG. 3 shows one embodiment of the invention in a schematic perspective view.

FIG. 3 schematically shows, in a perspective view, a further embodiment which comprises a rotor 1 in a manner corresponding to the embodiment shown in FIGS. 1 and 2. Again, the same parts are denoted by the same reference signs and are not all explained in detail again.

Permanent magnets 31 are pushed respectively between protrusions 21 of the rotor 1 shown in FIG. 3, said permanent magnets making it possible to use the rotor 1 as a rotor of an electric machine.

Figure 4:
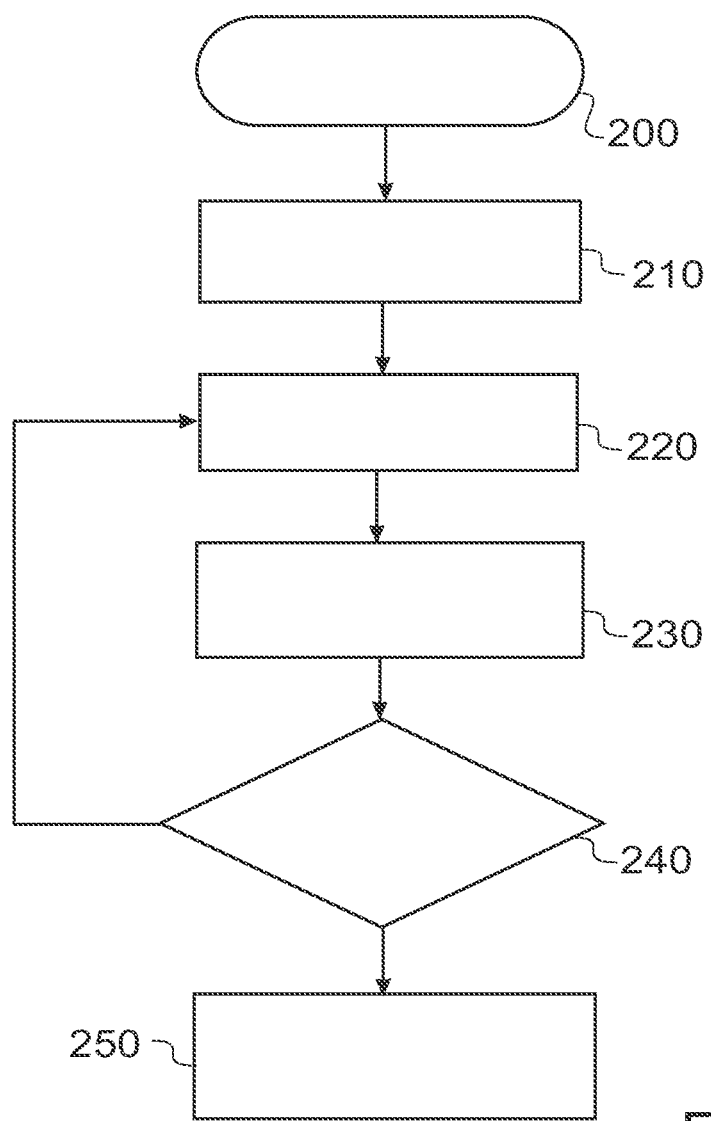
FIG. 4 shows a typical method according to the invention for producing a rotor in a schematic flow chart.

FIG. 4 shows, in a schematic flow chart, a typical method for producing a rotor, for example in one of the embodiments shown in FIGS. 1 and 2.

The method starts with a block 200. Then, a carrier is provided, block 210. By way of example, the carrier may be a horizontal carrier arranged on a lifting device which can be used to move the carrier upward or downward. The carrier is delimited laterally on all sides by a guide structure, for example by a cylinder.

Then, a layer of a metal powder is applied to the carrier. In typical embodiments, use is made of aluminum-silicon alloys, such as for example AlSi12, or titanium alloys or nickel-based alloys or other alloys or high-grade steels or tool steels. After the metal powder has been applied to the carrier, projecting metal powder is removed where appropriate, such as to form a uniformly thick layer of metal powder on the carrier.

Then, predetermined regions of the layer of the metal powder are sintered. To this end, use is made of a laser, that is to say selective laser sintering is carried out, block 230. The predetermined regions correspond to the material of the rotor including, for example, the outer shell, the lattice structure and the inner part or the side walls if appropriate with further elements in a specific axial plane, i.e. a plane of finite extent, which is perpendicular on the axis of the rotor. The production by selective laser sintering is typically started at one end of the rotor.

After a first layer of the metal powder has been sintered, the carrier is moved downward by a layer thickness, block 230. An enquiry is then made as to whether the rotor has already been produced completely by sintering or whether layers are still missing, block 240. Should layers still be missing, the method then returns to block 220 again, in which a further layer of metal powder is applied to the carrier and is removed in order to achieve a uniform height.

During the subsequent sintering, block 230, a pattern which has been changed with respect to the first pass is typically used for the selective sintering process, the pattern being oriented in turn to the structure of the rotor which is to be created. In block 230, a specific appropriate pattern is therefore used for the selective sintering depending on the plane to be manufactured.

If, by contrast, it is determined in block 240 that the rotor has been sintered completely, the method jumps to a block 250, in which the structure is removed. In this case, excess, non-sintered metal powder is removed by turning the structure, i.e. the rotor. The metal powder simply trickles out. If appropriate, the rotor can also be cleaned using compressed air, for example.

The selection of specific regions for the sintering process during the selective sintering has the effect that the structure corresponds to the rotor to be created, for example a rotor corresponding to the embodiment shown in FIGS. 1 and 2. To this end, the laser beam is moved over the powder layer by way of deflection mirrors during the sintering, such that the sintering gives rise to the corresponding structure. In the exemplary embodiment, the laser used is a $CO_2$ laser, although other lasers can also be used here.

FIG. 5 shows, in a schematic view, a lattice structure 300 as a combination of a body-centered cubic lattice and a face-centered cubic lattice, as is used in typical exemplary embodiments such as the exemplary embodiment shown in FIGS. 1 and 2.

The invention has been described with reference to embodiments which do not limit the scope of the invention. Instead, the scope of the invention is determined by the claims.

The invention claimed is:

1. A rotor for an electric machine, comprising
an outer shell for receiving magnets, and
a three-dimensional lattice structure arranged within the outer shell,
wherein the three-dimensional lattice structure varies in all directions in space in a three-dimensional coordinate system including in an axial direction of the rotor, and
wherein the lattice structure includes at least one unit cell comprising at least one strut, the at least one unit cell having a geometry selected from the group consisting of a face-centered cubic, a body-centered cubic, a tetrahedral lattice, a face-centered orthorhombic, a body-centered orthorhombic, and a combination thereof.

2. The rotor as claimed in claim 1, wherein the outer shell and the lattice structure are formed in one piece.

3. The rotor as claimed in claim 1, wherein the lattice structure represents a combination of a face-centered cubic and a body-centered cubic.

4. The rotor as claimed in claim 1, wherein the lattice structure has a radial extent of at least two unit cells.

5. The rotor as claimed in claim 1, wherein the lattice structure has an axial extent of at least ten unit cells.

6. The rotor as claimed in claim 1, wherein the lattice structure has a radial extent corresponding at least to the thickness of the outer shell.

7. The rotor as claimed in claim 1, comprising an inner part, which is connected to the outer shell by the lattice structure.

8. The rotor as claimed in claim 1, wherein the outer shell forms a closed structure.

9. The rotor as claimed in claim 1, wherein the rotor is produced by an additive method, in particular using a metal powder.

10. A rotor for an electric machine, comprising
an outer shell for receiving magnets, and
a three-dimensional lattice structure arranged within the outer shell,
wherein the three-dimensional lattice structure varies in all directions in space in a three-dimensional coordinate system including in an axial direction of the rotor;
wherein the lattice structure has a plurality of units cell each comprising at least one strut and each having a pre-defined geometry;
wherein the lattice structure has a radial extent of at least two unit cells, and
wherein the lattice structure has an axial extent of at least ten unit cells.

11. The rotor as claimed in claim 10, wherein the outer shell and the lattice structure are formed in one piece.

12. The rotor as claimed in claim 10, the lattice structure has a radial extent of at most 20 unit cells.

13. The rotor as claimed in claim 10, comprising an inner part, which is connected to the outer shell by the lattice structure.

14. The rotor as claimed in claim 13, wherein the inner part comprises openings allowing residual material to be discharged.

15. A method for producing a rotor comprising an outer shell for receiving magnets, and a three-dimensional lattice structure arranged within the outer shell, wherein the lattice structure is selected from the group consisting of a face-centered cubic, a body-centered cubic, a tetrahedral lattice, and a combination thereof, the method comprising:
   a. providing a carrier;
   b. applying a layer of a metal powder to the carrier;
   c. sintering predetermined regions of the layer of the metal powder;
   d. repeating steps b) and c) several times, wherein the regions are selected in order to create a structure corresponding to the rotor; and
   e. removing the structure from the carrier.

16. The method as claimed in claim 15, wherein the layers are applied in an axial direction.

17. The method as claimed in claim 15, wherein the lattice structure represents a combination of a face-centered cubic and a body-centered cubic.

18. The method as claimed in claim 15, wherein the outer shell forms a closed structure.

19. The method as claimed in claim 15, wherein the rotor comprises an inner part, which is connected to the outer shell by the lattice structure.

20. The method as claimed in claim 19, wherein the inner part comprises openings allowing residual material to be discharged.

* * * * *